United States Patent
Lei et al.

(10) Patent No.: US 11,479,190 B2
(45) Date of Patent: Oct. 25, 2022

(54) ON-BOARD STARTING POWER SUPPLY

(71) Applicant: SHENZHEN CARKU TECHNOLOGY CO., LIMITED, Guangdong (CN)

(72) Inventors: Yun Lei, Guangdong (CN); Zhifeng Zhang, Guangdong (CN)

(73) Assignee: SHENZHEN CARKU TECHNOLOGY CO., LIMITED, Shenzhen (CN)

( * ) Notice: Subject to any disclaimer, the term of this patent is extended or adjusted under 35 U.S.C. 154(b) by 131 days.

(21) Appl. No.: 16/772,075

(22) PCT Filed: Aug. 30, 2018

(86) PCT No.: PCT/CN2018/103295
§ 371 (c)(1),
(2) Date: Jun. 11, 2020

(87) PCT Pub. No.: WO2020/042091
PCT Pub. Date: Mar. 5, 2020

(65) Prior Publication Data
US 2020/0361405 A1  Nov. 19, 2020

(51) Int. Cl.
*B60R 16/033* (2006.01)
*H02H 7/20* (2006.01)
(Continued)

(52) U.S. Cl.
CPC ............ *B60R 16/033* (2013.01); *F21V 23/02* (2013.01); *F21V 23/04* (2013.01); *G06F 3/165* (2013.01);
(Continued)

(58) Field of Classification Search
CPC ... B60R 16/033; B60R 16/03; B60R 16/0307; B60R 16/005; B60R 16/0232;
(Continued)

(56) References Cited

U.S. PATENT DOCUMENTS

| 6,249,106 B1 | 6/2001 | Turner et al. |
| 2002/0121877 A1* | 9/2002 | Smith ............... H02J 7/0047 320/103 |

(Continued)

FOREIGN PATENT DOCUMENTS

| CN | 201797336 U | 4/2011 |
| CN | 201824889 U | 5/2011 |

(Continued)

OTHER PUBLICATIONS

International Search Report issued in International Application No. PCT/CN2018/103295, dated Dec. 12, 2018, pp. 1-4, State Intellectual Property Office of the P.R. China, Beijing, China.

(Continued)

*Primary Examiner* — Jared Fureman
*Assistant Examiner* — Aqeel H Bukhari
(74) *Attorney, Agent, or Firm* — Hauptman Ham, LLP

(57) ABSTRACT

The present disclosure discloses an on-board starting power supply detachably installed in a vehicle. The on-board starting power supply includes: an energy storage module configured to store electrical energy; a first output interface electrically coupled to the energy storage module and a starting device of the vehicle; and a plurality of second output interfaces respectively electrically coupled to the energy storage module and a variety of electrical equipments. The energy storage module is configured to output an instantaneous large current for the starting device through the first output interface to start the starting device and output a corresponding working voltage to a corresponding electrical equipment through the plurality of second output interfaces. The present disclosure can not only start the vehicle, but also includes a plurality of second output interfaces that can be coupled to a variety of electrical (Continued)

equipments, thereby improving a versatility of the on-board starting power supply.

19 Claims, 4 Drawing Sheets

(51) Int. Cl.
  *H02J 7/00* (2006.01)
  *F21V 23/04* (2006.01)
  *F21V 23/02* (2006.01)
  *G06F 3/16* (2006.01)
  *G10L 25/51* (2013.01)
  *H04R 3/00* (2006.01)
  *H04R 1/02* (2006.01)

(52) U.S. Cl.
  CPC .............. *G10L 25/51* (2013.01); *H02H 7/20* (2013.01); *H02J 7/0047* (2013.01); *H04R 1/025* (2013.01); *H04R 3/00* (2013.01); *H04R 2499/13* (2013.01)

(58) Field of Classification Search
  CPC .......... F21V 23/02; F21V 23/04; G06F 3/165; G10L 25/51; H02H 7/20; H02J 7/0047; H02J 7/00304; H02J 7/0063; H02J 2207/20; H04R 1/025; H04R 3/00; H04R 2499/13; G01S 19/42; Y02T 10/70
  See application file for complete search history.

(56) References Cited

U.S. PATENT DOCUMENTS

| | | |
|---|---|---|
| 2011/0298415 A1 | 12/2011 | Hetzroni |
| 2016/0046199 A1 | 2/2016 | Butler et al. |
| 2016/0049819 A1 | 2/2016 | Butler et al. |
| 2016/0204632 A1 | 7/2016 | Kleine et al. |
| 2018/0233934 A1* | 8/2018 | Miller ................ H02J 7/007 |
| 2020/0072177 A1* | 3/2020 | Clarke ................ B60L 53/62 |
| 2021/0028511 A1* | 1/2021 | Clarke ................ H02J 7/00714 |

FOREIGN PATENT DOCUMENTS

| | | |
|---|---|---|
| CN | 103151822 A | 6/2013 |
| CN | 103746414 A | 4/2014 |
| CN | 104485707 A | 4/2015 |
| CN | 204886387 U | 12/2015 |
| GB | 2466238 A | 6/2010 |
| JP | 3176581 U | 6/2012 |
| JP | 2013-52733 A | 3/2013 |
| JP | 3195927 U | 2/2015 |
| JP | 2015-115979 A | 6/2015 |
| JP | 2017-28801 A | 2/2017 |
| WO | 2014030348 A | 2/2014 |

OTHER PUBLICATIONS

The Extended European Search Report issued in corresponding EP Application No. EP18931444.6, dated Feb. 28, 2022.
The First Office Action issued in corresponding AU Application No. AU2018439818, dated Jul. 16, 2021.
The Second Office Action issued in corresponding AU Application No. AU2018439818, dated Feb. 9, 2021.
The First Office Action issued in corresponding JP Application No. JP2021-515257, dated Jan. 25, 2022.
The Second Office Action issued in corresponding JP Application No. JP2021-515257, dated Jun. 14, 2022.

* cited by examiner

ON-BOARD STARTING POWER SUPPLY

RELATED APPLICATION

The present application is a U.S. National Phase of International Application Number PCT/CN2018/103295, filed Aug. 30, 2018.

TECHNICAL FIELD

The present disclosure relates to technical fields of automotive power supply, in particular to, an on-board starting power supply.

BACKGROUND

Various internal combustion engine vehicles have become people's daily transportation and transportation means, such as passenger cars, passenger bus, trucks that transport goods, etc. The start of these vehicles is realized by a starting power supply, and the engine is driven by the starting power supply. However, the function of the existing starting power supply is relatively simple, and can only be used to start the vehicle. When the vehicle does not need to be started, the starting power supply is in an idle state, which makes a utilization rate of the starting power supply low.

SUMMARY

The embodiments of the present disclosure disclose an on-board starting power supply, which can not only start a vehicle, but also supply power to a variety of electrical equipments, so that the functions of the on-board starting power supply are diversified, thereby improving a utilization rate.

An embodiment of the present disclosure discloses an on-board starting power supply, which is detachably installed in a vehicle. The on-board starting power supply includes:

an energy storage module configured to store electrical energy;

a first output interface electrically coupled to the energy storage module and a starting device of the vehicle, and the energy storage module being configured to output an instantaneous large current for the starting device through the first output interface to start the starting device; and a plurality of second output interfaces respectively electrically coupled to the energy storage module and a variety of electrical equipments, and the energy storage module being used to output a corresponding working voltage to a corresponding electrical equipment through the plurality of second output interfaces.

The on-board starting power supply of the present disclosure, because it is detachably installed in the vehicle, can not only start the vehicle through the first output interface, but also supply power to a variety of electrical equipments through the plurality of second output interfaces, thereby making the functions of on-board starting power supply diversified and improving the utilization rate.

BRIEF DESCRIPTION OF THE ACCOMPANYING DRAWINGS

In order to more clearly explain the technical solutions in the embodiments of the present disclosure, the following will briefly introduce the drawings required in the embodiments. Obviously, the drawings in the following description are only some embodiments of the present disclosure. Those of ordinary skill in the art can obtain other drawings based on these drawings without creative work.

DETAILED DESCRIPTION OF ILLUSTRATED EMBODIMENTS

The technical solutions in the embodiments of the present disclosure will be described clearly and completely below with reference to the drawings in the embodiments of the present disclosure. Obviously, the described embodiments are only a part of the embodiments of the present disclosure, but not all the embodiments. Based on the embodiments in the present disclosure, all other embodiments obtained by a person of ordinary skill in the art without creative work fall within the scope of protection of the present disclosure.

The singular forms "a", "said" and "the" used in the embodiments of the present disclosure and the appended claims are also intended to include the majority forms unless the context clearly indicates other meanings. It should also be understood that the term "and/or" as used herein refers to and includes any or all possible combinations of one or more associated listed items.

Unless otherwise defined, all technical and scientific terms used herein have the same meaning as commonly understood by those skilled in the technical field of the present disclosure. The terminology used in the specification of the present disclosure herein is for the purpose of describing specific embodiments only, and is not intended to limit the present disclosure.

Figure 1:
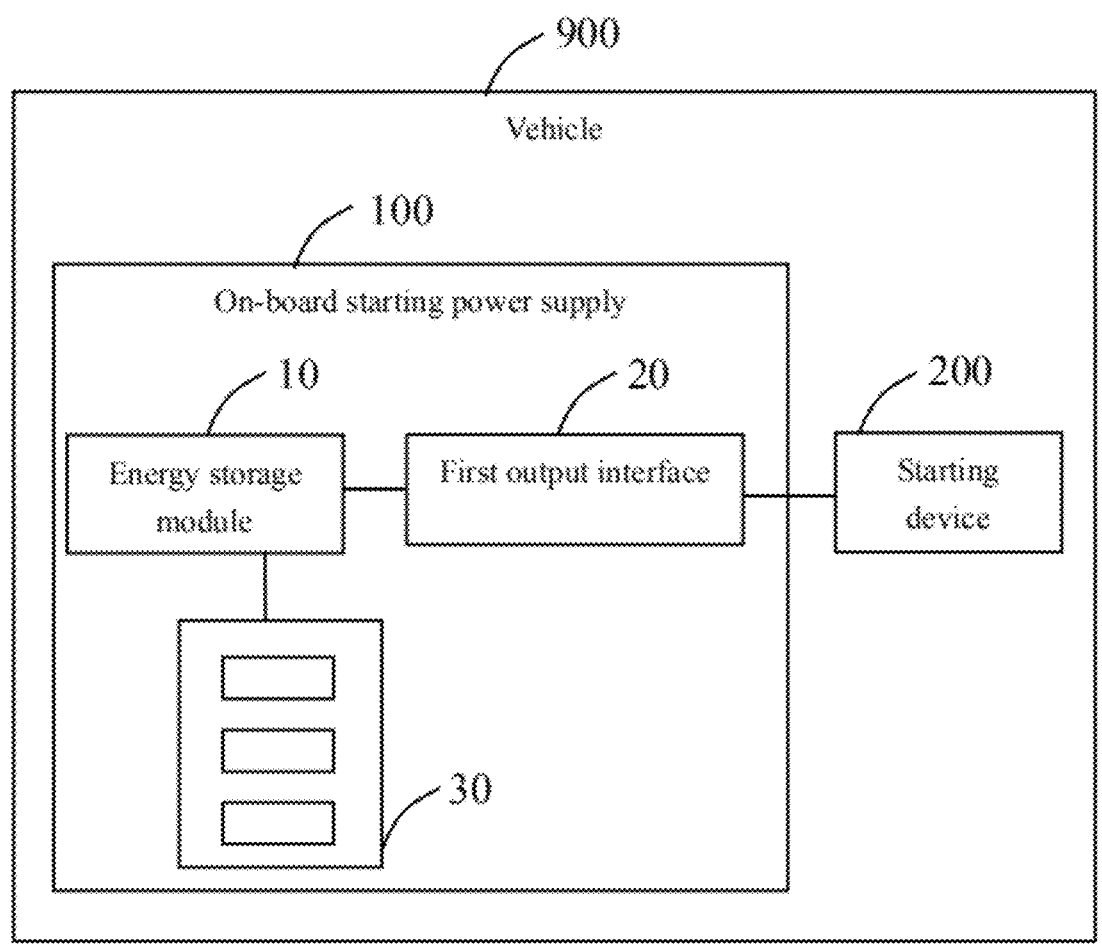
FIG. 1 is a schematic structural diagram of an on-board starting power supply according to a first embodiment of the present disclosure.

Please referring to FIG. 1, a schematic structural diagram of an on-board starting power supply 100 according to one embodiment of the present disclosure is illustrated. The on-board starting power supply 100 is detachably installed in a vehicle 900, and is electrically coupled to a starting device 200 of the vehicle 900 to start the vehicle 900. The starting device 200 may be a motor. When starting, the on-board starting power supply 100 drives the motor to work, and then the motor drives an engine to work, thereby completing the start of the vehicle 900.

As shown in FIG. 1, the on-board starting power supply 100 includes an energy storage module 10 for storing electrical energy, a first output interface 20, and a plurality of second output interfaces 30. The first output interface 20 is electrically coupled to the energy storage module 10 and the starting device 200 of the vehicle 900. The energy storage module 10 is used to output an instantaneous large current for the starting device 200 through the first output interface 20 to start the starting device 200. The plurality of second output interfaces 30 are electrically coupled to the energy storage module 10 and a variety of electrical equipments (not shown) respectively. The energy storage module 10 is used to output corresponding working voltage to the corresponding electrical equipment through the plurality of second output interfaces 30. For example, the energy storage module 10 charges electronic devices such as mobile phones through the plurality of second output interfaces 30, thereby providing convenience for users and improving user experience. The plurality of second output interfaces 30 may be provided on an integrated circuit board.

In this embodiment, the plurality of second output interfaces 30 include at least one of a 220V AC interface, a 110V AC interface, a USB interface, and a DC interface. Specifically, the USB interface includes but is not limited to a USB-A interface, a USB-B interface (micro USB interface), a USB-C interface (Type-c interface), and so on. It can be understood that the specific specifications of the USB interface may be set according to actual usage, and are not specifically limited herein.

Figure 2:
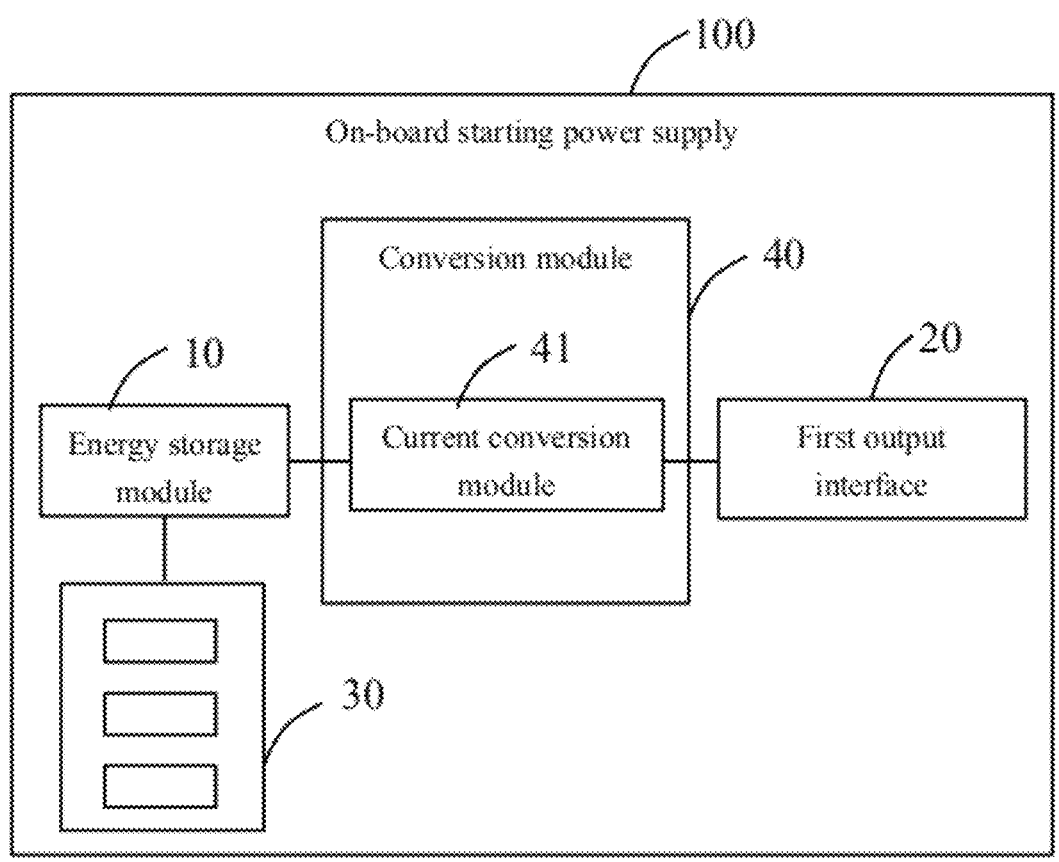
FIG. 2 is a schematic structural diagram of an on-board starting power supply according to a second embodiment of the present disclosure.

Please referring to FIG. 2 again, the on-board starting power supply 100 further includes a conversion module 40, which is electrically coupled between the energy storage module 10 and the first output interface 20. The conversion module 40 is used to convert the electrical energy output by the energy storage module 10 into an instantaneous large current when a starting signal is received and output to the starting device 200 through the first output interface 20, for the starting device 200 to start the vehicle 900. In this embodiment, the starting signal may be generated when a vehicle key of the vehicle 900 is in a certain gear position. For example, when the vehicle key of the vehicle 900 is in the "START" gear, the vehicle 900 generates the starting signal. In other embodiments, the starting signal may also be generated according to the user's operation instruction, for example, when the user presses a certain switch, the starting signal is generated.

Specifically, the energy storage module 10 includes a voltage output. The conversion module 40 includes a current conversion circuit 41. The current conversion circuit 41 is electrically coupled between the voltage output of the energy storage module 10 and the first output interface 20, and is used to convert the electrical energy output by the energy storage module 10 into an instantaneous large current, and supply the instantaneous large current through the first output interface 20 to the starting device 200. The instantaneous large current can reach more than 1000A, which can be set according to actual usage, and is not specifically limited here.

In some embodiments, the first output interface 20 includes, but is not limited to, connectors, wire clips, pins, jacks, etc., and is not specifically limited herein. When in use, the first output interface 20 is fixedly connected to a connection end on the starting device 200. When the on-board starting power supply 100 needs to be removed from the vehicle 900, the first output interface 20 and the connection end of the starting device 200 may be separated.

Specifically, the energy storage module 10 includes but is not limited to a lead-acid battery pack, a lithium battery pack, a super capacitor, or any combination thereof, etc., which is not limited herein. It can be understood that, in order to improve the electrical energy output by the energy storage module 10, the battery pack included in the energy storage module 10 is composed of several single cells connected in series and parallel. Obviously, the number of single cells included in the battery pack can be set according to specific design requirements, which is not limited herein.

Since the on-board starting power supply 100 disclosed in the present disclosure is detachably installed in the vehicle 900, it can not only start the vehicle 900 through the first output interface 20, but also supply power to a variety of electrical equipments through the plurality of second output interfaces 30, which in turn diversifies the functions of on-board starting power supply 100, thereby improving the utilization rate.

Figure 3:
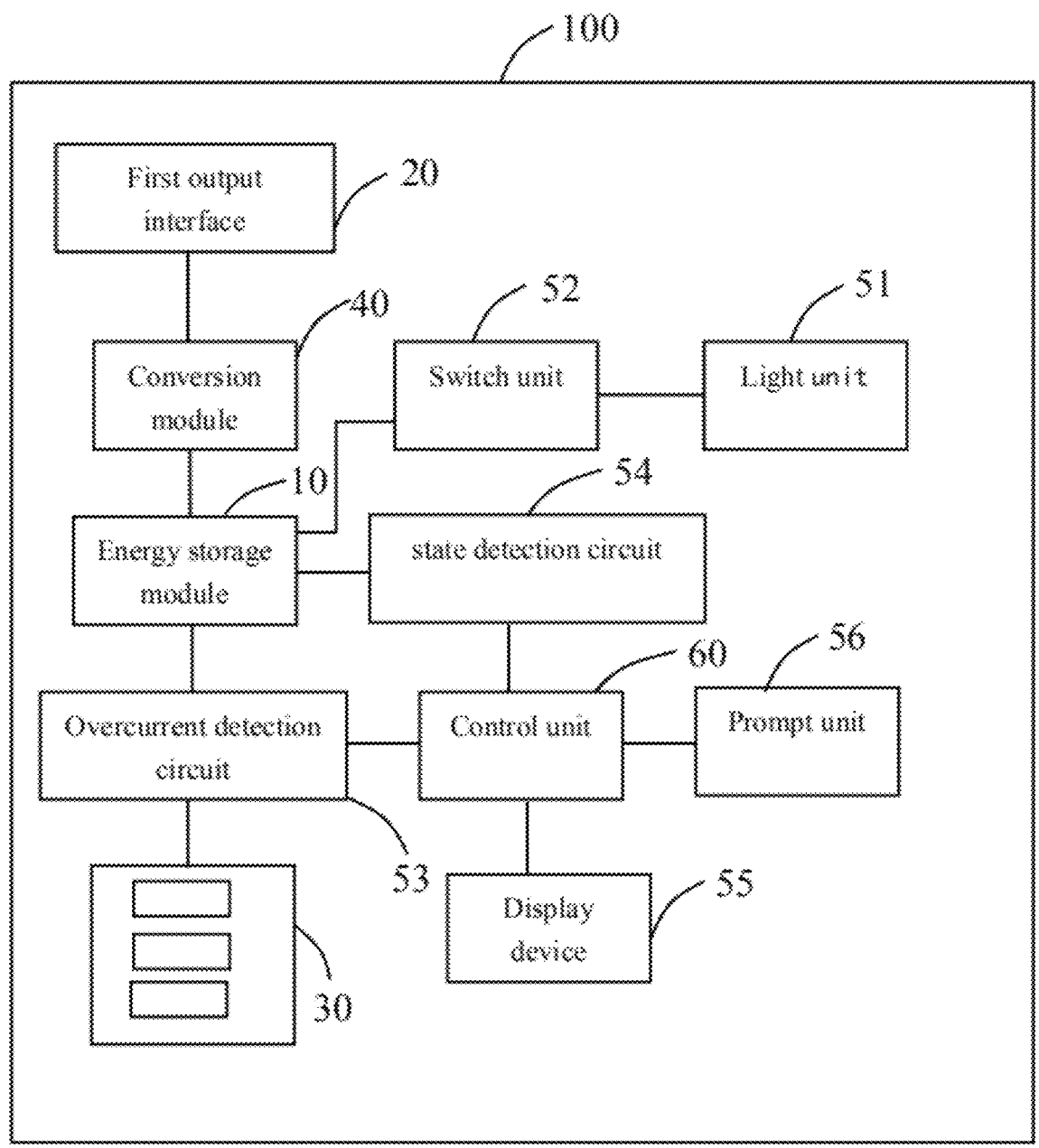
FIG. 3 is a schematic structural diagram of an on-board starting power supply according to a third embodiment of the present disclosure.

Please referring to FIG. 3 again, in some embodiments, the on-board starting power supply 100 further includes a light unit 51 and a switch unit 52. The light unit 51 is electrically coupled to the energy storage module 10 and used to receive electric energy from the energy storage module 10 and emit light. The light unit 51 includes but is not limited to an incandescent lamp, LED (Light Emitting Diode) and the like.

The switch unit 52 is electrically coupled between the energy storage module 10 and the light unit 51, and is used to establish or disconnect the electrical connection between the energy storage module 10 and the light unit 51 in response to user's operations. The switch unit 52 may be a key switch, a toggle switch, or a touch switch. The user may press, touch, or toggle the switch unit 52 to disconnect or establish an electrical connection between the light unit 51 and the energy storage module 10.

Specifically, when the light unit 51 and the energy storage module 10 establish the electrical connection, the light unit 51 emits light; when the light unit 51 and the energy storage module 10 are disconnected from the electrical connection, the light unit 51 stops emitting light, so the user can control whether the vehicle-mounted starting power supply 100 emits light through the switch unit 52. When the on-board starting power supply 100 emits light, it can be used as a lighting device (such as a flashlight). When a user drives a picnic outing, there is no need to carry an additional lighting device, and only the on-board starting power supply 100 needs to be removed from vehicle 900.

Furthermore, in order to improve the safety of the on-board starting power supply 100, in some embodiments, the on-board starting power supply 100 may further include an overcurrent detection circuit 53 and a control unit 60. The overcurrent detection circuit 53 is electrically coupled between the energy storage module 10 and the plurality of second output interfaces 30, and is controlled by the control unit 60. The overcurrent detection circuit 53 is used to detect a current value output by the energy storage module 10 to the other electrical equipment through the plurality of second output interfaces 30, and send the detected current value to the control unit 60. The control unit 60 is used to determine whether the current value output by the energy storage module 10 exceeds a preset threshold, and when it is determined that the current value output by the energy storage module 10 is greater than the preset threshold, control the energy storage module 10 to stop second output interface 30 output current. For example, when the output current caused by the short circuit is too large, the energy storage module 10 is controlled to stop outputting current to the corresponding second output interface 30, so that the on-board starting power supply 100 itself and other electrical equipment can be protected.

In some embodiments, the on-board starting power supply 100 further includes a state detection circuit 54 and a display device 55. The state detection circuit 54 is coupled to the energy storage module 10, and is used to detect relevant electrical parameters of the energy storage module 10 in real time and send the relevant electrical parameters to the control unit 60. The control unit 60 is coupled to the state detection circuit 54 and the display device 55 respectively, and is used to control the related electrical parameters to be displayed in the display device 55. The relevant electrical parameter includes information such as the voltage value, remaining power and internal resistance of the energy storage module 10. The display device 55 may be a display screen. Of course, the display screen includes but is not limited to a liquid crystal display screen, an organic light emitting diode display screen, and the like.

In this embodiment, the relevant electrical parameters of the energy storage module 10 are detected by the state detection circuit 54 and displayed on the display device 55, and the performance of the energy storage module 10 can be intuitively displayed, which is convenient for users to understand the relevant situation of on-board starting power supply 100 in time.

In another embodiment, the on-board starting power supply 100 further includes a prompt unit 56 electrically coupled to the control unit 60. The control unit 60 is also used to determine whether a state of the energy storage module 10 is abnormal according to the relevant electrical parameters, and to control the prompt unit 56 to issue a prompt message when the energy storage module 10 is determined to be in an abnormal state, so as to remind the user in time replace or maintain the on-board starting power supply 100, so that the user can avoid the occurrence of a safety accident caused by the use failure or the on-board starting power supply 100 with potential safety hazards.

The abnormal state means that the related electrical parameters are not within the preset range. For example, the energy of the energy storage module 10 is too low. If it continues to be used at this time, it will affect the service life of the on-board starting power supply 100, and even damage. In this embodiment, the prompt unit 56 may be a buzzer, a light emitting diode, or the like, which alerts the user that the on-board starting power supply 100 is in the abnormal state by issuing an alarm sound or different colors. Of course, in other embodiments, the prompt unit 56 may also be omitted, and the control unit 60 controls the display of the abnormal state information through the display device 55.

It should be noted that the embodiments of the present disclosure do not limit the specific circuit structures of the overcurrent detection circuit 53 and the state detection circuit 54 in the foregoing embodiments, as long as they can implement the corresponding functions.

In this embodiment, the control unit 60 may be a single chip microcomputer, a microcontrol unit (MCU), or the like. The control unit 60 may include multiple signal acquisition ports and control ports, etc., and the control unit 60 may also be electrically coupled to the overcurrent detection circuit 53 and the state detection circuit 54 through its multiple signal acquisition ports to acquire various signals to detect the state of the energy storage module 10. The control unit 60 may also be electrically coupled to the display device 55 and the prompt unit 56 through its control port to perform corresponding control on the corresponding circuit or device.

Figure 4:
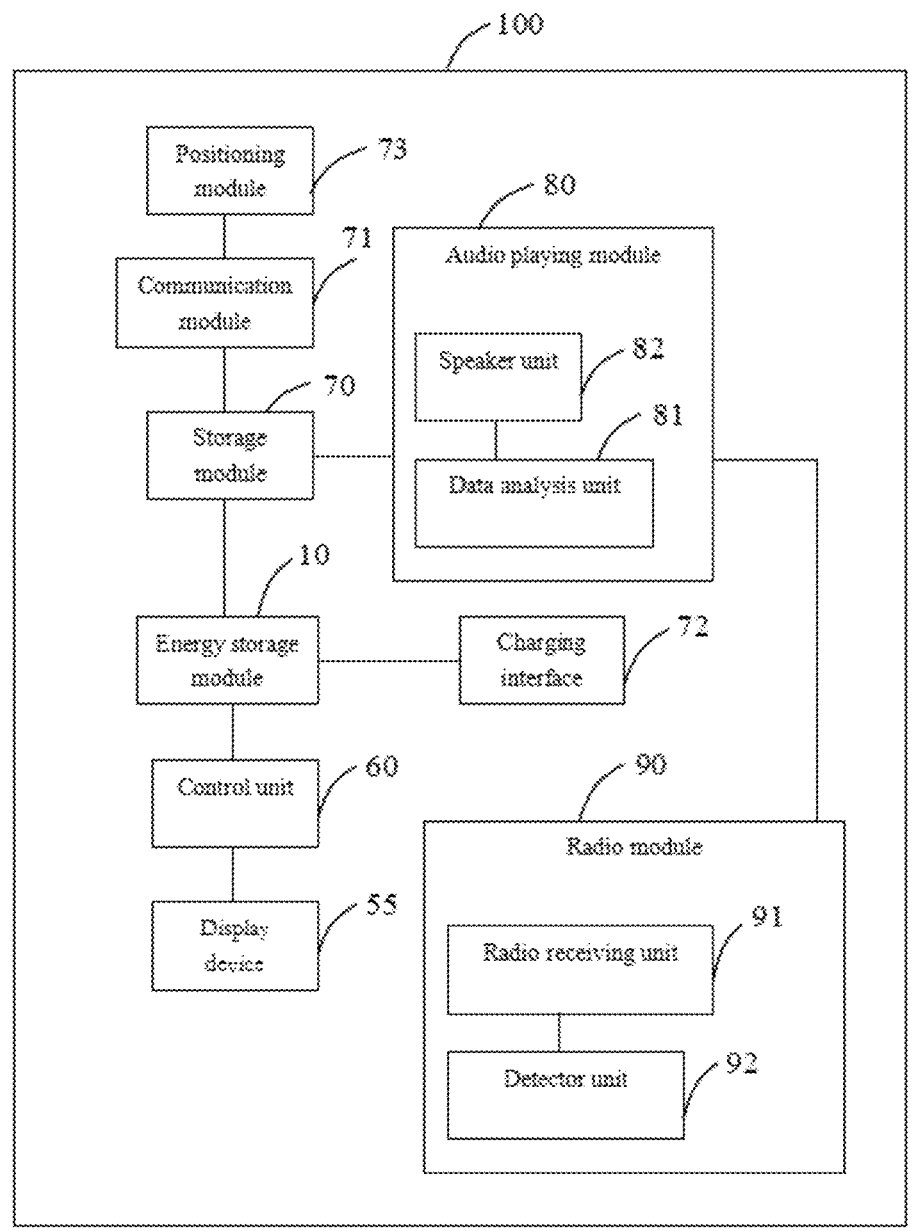
FIG. 4 is a schematic structural diagram of an on-board starting power supply according to a fourth embodiment of the present disclosure.

Please referring to FIG. 4 again, in order to improve the versatility of the on-board starting power supply 100, the on-board starting power supply 100 further includes a storage module 70 and an audio playing module 80 coupled to the storage module 70. The storage module 70 is used to store audio files. The audio playing module 80 is used to play the audio files. The storage module 70 includes but is not limited to a hard disk, a memory, an intelligent memory card, a flash memory card, etc.

Specifically, the audio playing module 80 includes a data analysis unit 81 and a speaker unit 82 electrically coupled to the data analysis unit 81. The data analysis unit 81 is used to parse the audio file in the storage module 70 into electrical signals and drive the speaker unit 82 to play. In this embodiment, the speaker unit 82 may be a speaker. In other embodiments, the speaker unit 82 may also be other components with a sound playback function. As such, the on-board starting power supply 100 disclosed in this embodiment also has a music playing function.

In some other embodiments, the on-board starting power supply 100 further includes a communication module 71 for communicating with an external electronic device, so that the audio file stored in the storage module 70 can be played by the external electronic device. The communication module 71 includes but is not limited to a Bluetooth module, a Wi-Fi module, an infrared module, etc. Preferably, the communication module 71 is a BLE Bluetooth module with low energy consumption and fast data transmission. In this way, the on-board starting power supply 100 can be coupled to an external electric device (such as a Bluetooth speaker) through the communication module 71 for music playback, which can achieve better playback effects and improve user experience. In some other embodiments, the on-board starting power supply 100 also receives a control command sent by an external electronic device through the communication module 71, and performs a corresponding function according to the control command, so that when the user needs to control the on-board starting power supply 100, a command can be sent through a mobile terminal (such as a mobile phone), thereby achieving the purpose of remote control, which is convenient for user operations and improves the user experience.

In addition, the storage module 70 is also used to store video files. The control unit 60 is also used to control the display device 55 to display and play the video files for users to watch. Of course, it is also possible to communicate with the external electronic device through the communication module 70 to receive the video file in the external electronic device, and play the received video file in the external electronic device through the display device 55.

In some embodiments, the on-board starting power supply 100 further includes a radio module 90. The radio module 90 is used to listen to broadcast audio signals. Specifically, the radio module 90 includes a radio receiving unit 91 and a detector unit 92 coupled to the radio receiving unit 91. In this embodiment, the radio receiving unit 91 is used to receive radio waves of a specific frequency, and the detector unit 92 is used to demodulate the radio waves to restore corresponding audio signals and play the audio signals through the audio module 80. Therefore, the on-board starting power supply 100 in this embodiment also has the function of a radio.

In addition, the on-board starting power supply 100 further includes at least one charging interface 72 electrically connected to the energy storage module 10. The energy storage module 10 receives charging from an external power source through the at least charging interface 72. Specifically, the at least one charging interface 72 includes but is not limited to a DC charging interface, an AC charging interface and a solar charging interface. In this way, the on-board starting power supply 100 can be coupled to a DC power output device, an AC power output device, or a solar power output device for charging.

In other embodiments, the on-board starting power supply 100 further includes a positioning module 73. The positioning module 73 is coupled to the communication module 71 and is used to obtain a position of the vehicle 900 and send the position through the communication module 71. Thus, when the vehicle 900 fails (for example, an anchor is dropped), the on-board starting power supply 100 can also communicate with an outside world and send the position of vehicle 900 to get rescue in time. The outside world may be a monitoring center or a third-party mobile terminal.

In this embodiment, the positioning module 73 is a GPS positioning module. It can be understood that, in other embodiments, the positioning module 73 may also be a Beidou positioning module.

The embodiments of the present disclosure are described in detail above, and specific examples are used to explain the principles and embodiments of the present disclosure. The descriptions of the above embodiments are only used to help understand the method and the core idea of the present disclosure; at the same time, those of ordinary skill in the art, according to the ideas of the present disclosure, may have changes in specific embodiments and application scopes. In summary, the content of this specification should not be construed as limiting the present disclosure.

What is claimed is:

1. An on-board starting power supply, which is detachably installed in a vehicle, wherein the on-board starting power supply comprises:
    an energy storage module, configured to store electrical energy;
    a first output interface, electrically coupled to the energy storage module and a starting device of the vehicle, and the energy storage module being configured to output an instantaneous large current for the starting device through the first output interface to start the starting device; and
    a plurality of second output interfaces respectively electrically coupled to the energy storage module and a variety of electrical equipment,
    wherein the energy storage module is configured to output a corresponding working voltage to a corresponding electrical equipment through the plurality of second output interfaces,
    wherein the on-board starting power supply further comprises a conversion module electrically coupled between the energy storage module and the first output interface; the conversion module is configured to convert the electrical energy output by the energy storage module into an instantaneous large current and output the instantaneous large current to the starting device through the first output interface when a starting signal is received, so as to start the starting device, and
    wherein the starting signal is generated when a vehicle key of the vehicle is in a "START" gear.

2. The on-board starting power supply according to claim 1, wherein the plurality of second output interfaces comprise at least one of a 220V AC interface, a 110V AC interface, a USB interface, or a DC interface.

3. The on-board starting power supply according to claim 1, wherein the energy storage module comprises a voltage output; the conversion module comprises:
    a current conversion circuit electrically coupled to the voltage output of the energy storage module for converting the electrical energy output by the energy storage module into an instantaneous large current, and further supply the instantaneous large current to the starting device through the first output interface.

4. The on-board starting power supply according to claim 1, wherein the on-board starting power supply further comprises:
    a light unit electrically coupled to the energy storage module, for receiving electric energy from the energy storage module and emitting light; and
    a switch unit electrically coupled between the energy storage module and the light unit, and configured to establish or disconnect an electrical connection between the energy storage module and the light unit in response to user's operations.

5. The on-board starting power supply according to claim 4, wherein the switch unit comprises any one of a key switch, a toggle switch, or a tact switch.

6. The on-board starting power supply according to claim 1, wherein the energy storage module comprises a lithium battery pack, a lead-acid battery pack, a super capacitor, or any combination thereof.

7. The on-board starting power supply according to claim 1, wherein the on-board starting power supply further comprises:
    an overcurrent detection circuit electrically coupled between the energy storage module and the plurality of second output interfaces, for detecting a current value output by the energy storage module through the plurality of second output interfaces; and
    a control unit electrically coupled to the overcurrent detection circuit, configured to determine whether the current value output by the energy storage module exceeds a preset threshold, and when it is determined that the current value output by the energy storage module is greater than the preset threshold, the energy storage module is controlled to stop outputting current to the corresponding second output interface.

8. The on-board starting power supply according to claim 7, wherein the plurality of second output interfaces comprise at least one of a 220V AC interface, a 110V AC interface, a USB interface, or a DC interface.

9. The on-board starting power supply according to claim 1, wherein the on-board starting power supply further comprises a state detection circuit, a control unit and a display device; the state detection circuit and the energy storage module are coupled to detect relevant electrical parameters of the energy storage module in real time; the control unit is coupled to the state detection circuit and the display device respectively, and is configured to control the display device to display the relevant electrical parameters.

10. The on-board starting power supply according to claim 9, wherein the on-board starting power supply further comprises a prompt unit electrically coupled to the control unit, and the control unit is configured to determine whether a state of the energy storage module is abnormal according to the related electrical parameters, and to control the prompt unit to issue a prompt message when it is determined that the energy storage module is in an abnormal state.

11. The on-board starting power supply according to claim 1, wherein the on-board starting power supply further comprises a storage module and an audio playing module coupled to the storage module; the storage module is configured for storing audio files; the audio playing module is configured to play the audio files.

12. The on-board starting power supply according to claim 11, wherein the audio playing module comprises a data analysis unit and a speaker unit electrically coupled to the data analysis unit; the data analysis unit is configured to parse the audio files in the storage module into electrical signals and further drive the speaker unit to play.

13. The on-board starting power supply according to claim 11, wherein the on-board starting power supply further comprises a communication module for communicating with an external electronic device, so as to play the audio files in the storage module through the external electronic device.

14. The on-board starting power supply according to claim 11, wherein the on-board starting power supply further comprises a radio module; the radio module comprises a radio receiving unit and a detector unit electrically coupled to the radio receiving unit; the radio receiving unit is configured to receive radio waves of a specific frequency, and the detector unit is configured to demodulate the radio waves to restore corresponding audio signals and play the audio signals through the audio playing module.

15. The on-board starting power supply according to claim 1, wherein the on-board starting power supply further comprises at least one charging interface; the energy storage module receives external electric energy through the at least one charging interface for charging.

16. The on-board starting power supply according to claim 15, wherein the at least one charging interface comprises at least one of a DC charging interface, an AC charging interface, or a solar charging interface.

17. The on-board starting power supply according to claim 1, wherein the on-board starting power supply further comprises a positioning module and a communication module; the positioning module is configured to obtain a position of the vehicle and send the position through the communication module.

18. The on-board starting power supply according to claim 17, wherein the positioning module is a GPS positioning module or a Beidou positioning module.

19. The on-board starting power supply according to claim 1, wherein the on-board starting power supply further comprises a communication module, and the communication module is configured to communicate with an external electronic device; the on-board starting power supply also receives control commands sent by the external electronic device through the communication module, and performs corresponding functions according to the control commands.

* * * * *